United States Patent
Femling

[19]

[11] Patent Number: 5,938,258

[45] Date of Patent: Aug. 17, 1999

[54] POWER ACTUATED TWEEZER

[75] Inventor: Richard C. Femling, Roseville, Minn.

[73] Assignee: Master Appliance Corp., Racine, Wis.

[21] Appl. No.: 08/963,161

[22] Filed: Nov. 3, 1997

Related U.S. Application Data

[63] Continuation-in-part of application No. 08/601,765, Feb. 15, 1986, abandoned.

[51] Int. Cl.$^6$ ........................................ B25J 15/08
[52] U.S. Cl. ........................ 294/104; 294/88; 294/116; 294/902
[58] Field of Search ................ 294/19.1, 24, 86.15, 294/86.28–86.31, 88, 99.2, 100, 104, 106, 115, 116, 86.4, 902, 95; 269/281, 283, 284; 414/740, 753; 901/37, 39

[56] References Cited

U.S. PATENT DOCUMENTS

| | | | |
|---|---|---|---|
| 3,403,901 | 10/1968 | Servadio | 269/284 X |
| 3,471,191 | 10/1969 | Schwab | 294/88 |
| 3,630,391 | 12/1971 | Wilson | 294/116 X |
| 3,844,599 | 10/1974 | Burian | 294/104 X |
| 3,885,825 | 5/1975 | Amberg et al. | 294/115 |
| 4,211,123 | 7/1980 | Mack | 294/116 X |
| 4,315,424 | 2/1982 | Jarman et al. | 294/116 X |
| 4,543,032 | 9/1985 | Leverett et al. | 294/902 X |
| 4,660,274 | 4/1987 | Goumas et al. | 294/902 X |
| 4,897,014 | 1/1990 | Tietze | 294/86.4 X |
| 5,033,785 | 7/1991 | Woolley | 294/104 |

*Primary Examiner*—Johnny D. Cherry
*Attorney, Agent, or Firm*—Arthur J. Hansmann

[57] ABSTRACT

A device for manipulating an object, the device including a housing, a first gripping member that is supported by the housing, with the first gripping member having a surface that defines a first bore or a first recess, a second gripping member that is supported by the housing, an activating mechanism capable of causing movement of at least the first gripping member or the second gripping member to place the first gripping member and the second gripping member in gripping relation with the object, and an engagement mechanism supported by the housing, the engagement mechanism capable of engaging the first bore or first recess to selectively prevent movement of the first gripping member away from the activating mechanism.

30 Claims, 5 Drawing Sheets

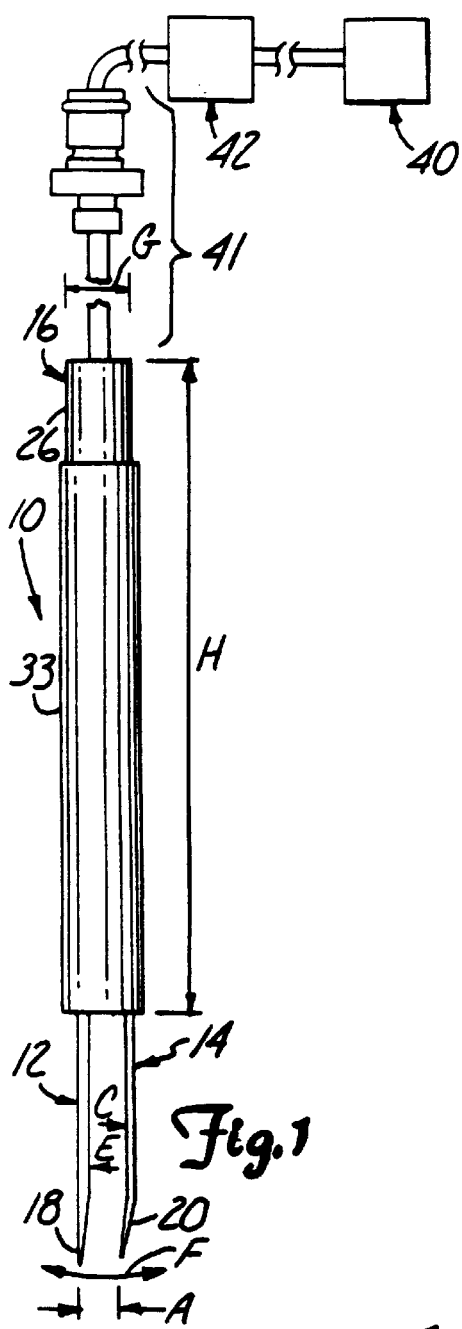
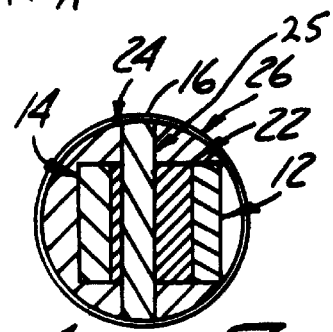
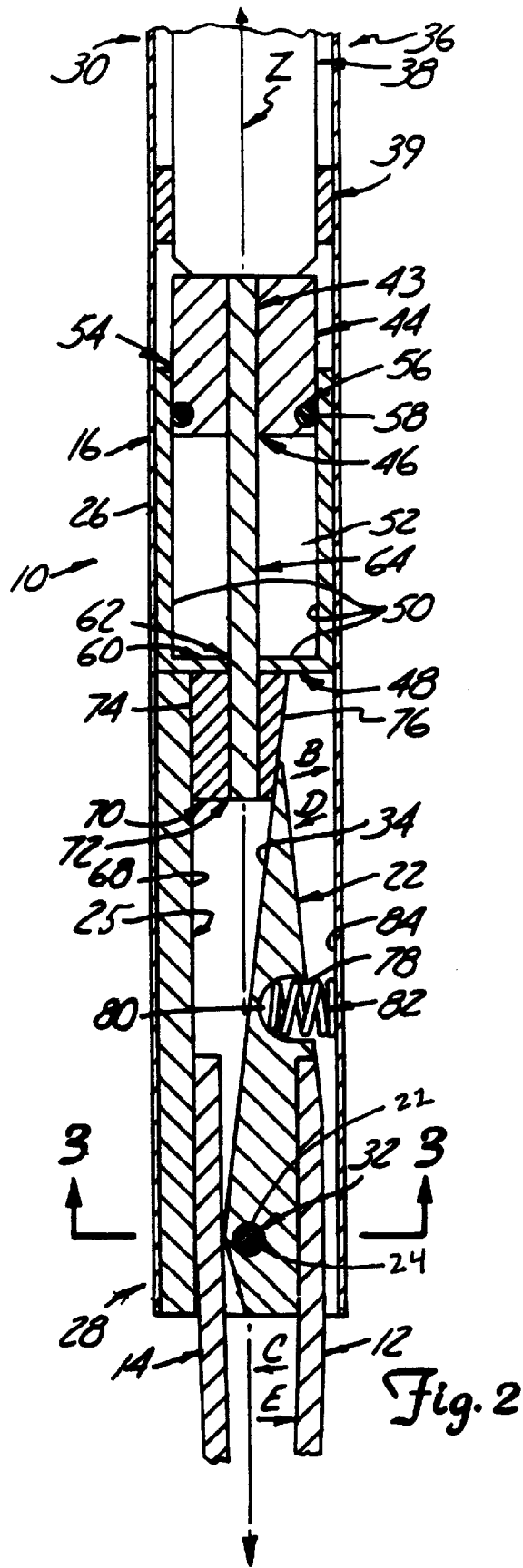
Fig. 1
Fig. 2
Fig. 3

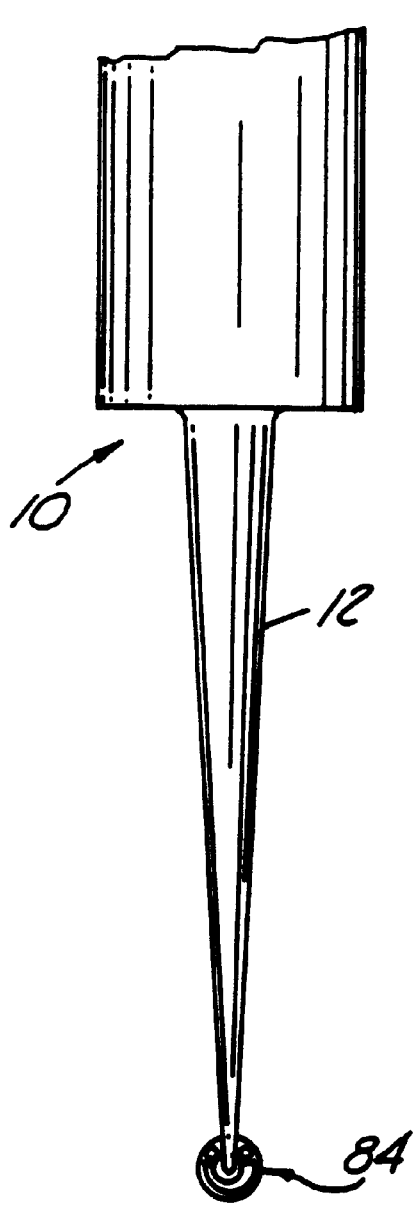
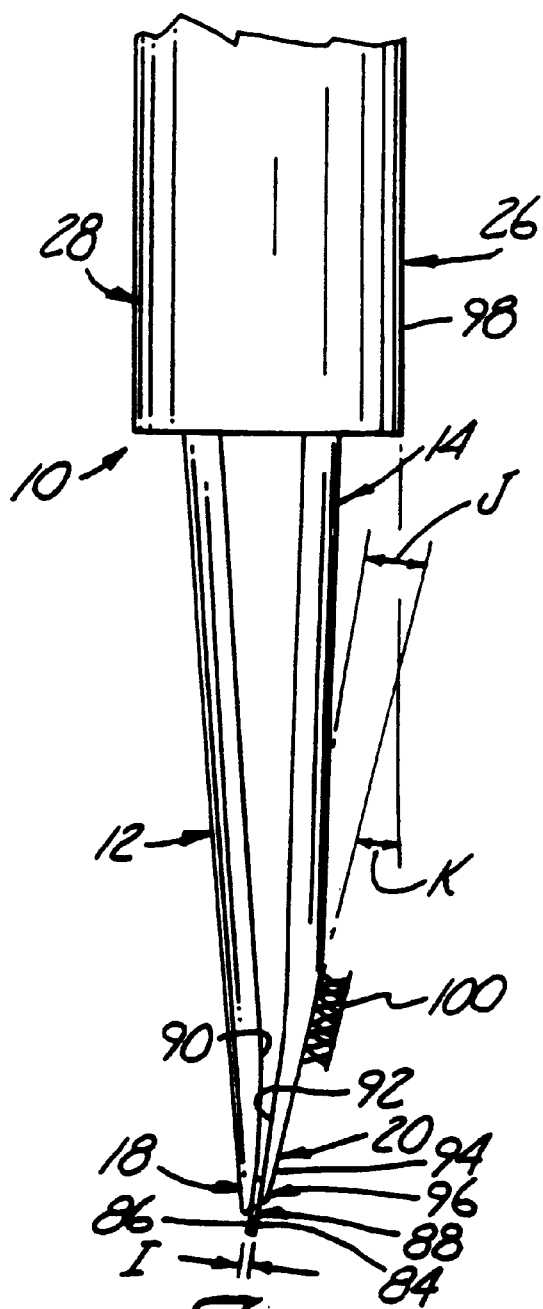

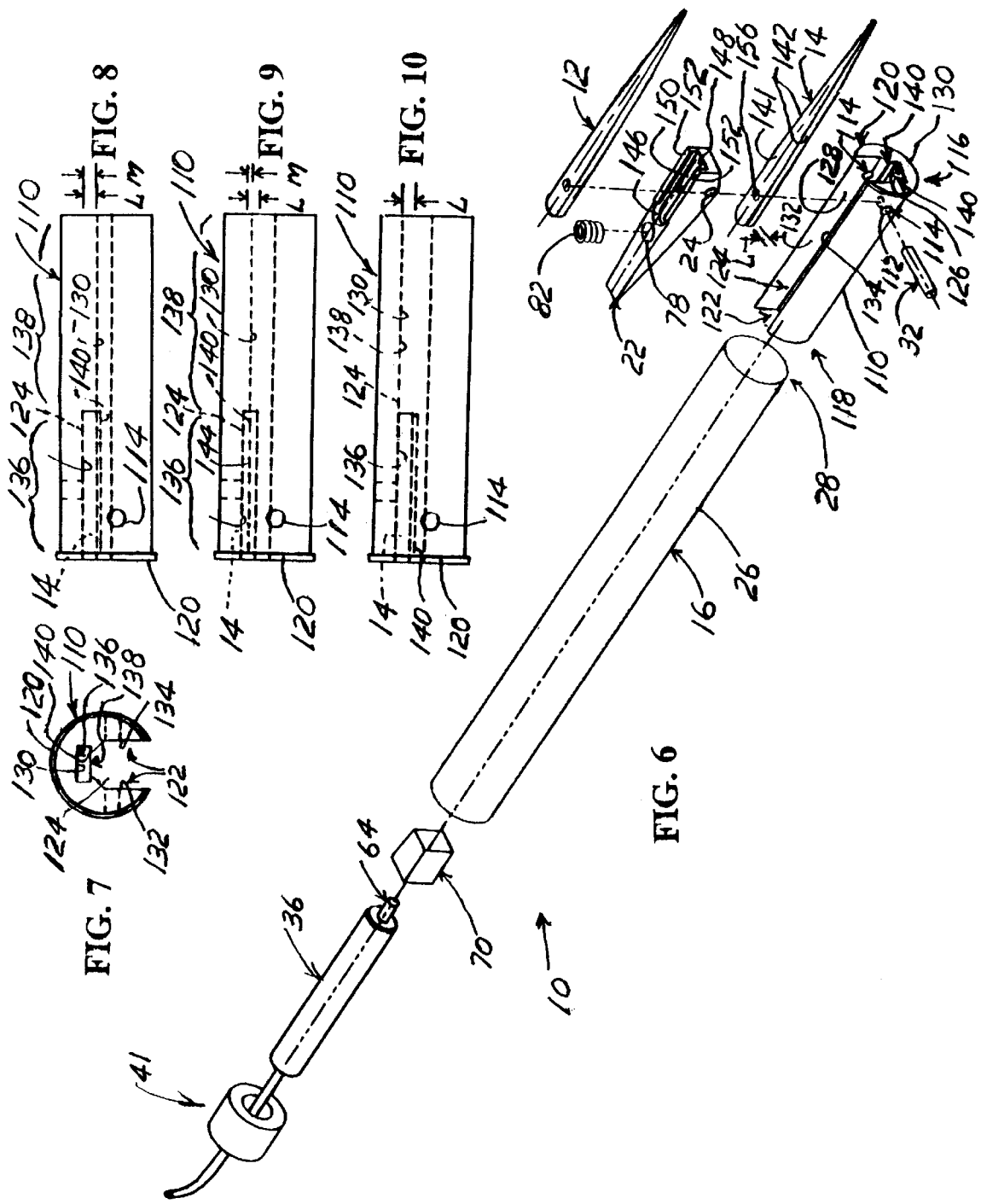

POWER ACTUATED TWEEZER

This application is a continuation-in-part of application Ser. No. 08/601,765 filed on Feb. 15, 1996, now abandoned.

BACKGROUND OF THE INVENTION

The present invention generally relates to a device that is useful for manipulating small objects. More specifically, the present invention relates to a power actuated tweezer for handling small objects.

Product manufacture and assembly in many industries, such as the medical products industry and the electronics industry, often requires repetitive handling of small objects, such as integrated circuits, amplifiers, fasteners, and wires. Many small objects are too small to be efficiently handled using only the hands of manufacturing personnel. Therefore, manufacturing personnel, such as assembly personnel, presently rely on manually activated hand-held devices, such as manually activated tweezers, to grip small objects.

However, manually activated hand-held devices are not without problems. For example, manufacturing personnel who repeatedly pick up and manipulate small objects with manually activated hand-held devices sometimes suffer physical injuries to muscles and nerves of the hand and wrist, such as carpal tunnel syndrome. Also, manufacturing inefficiencies often exist due to use of the manually activated hand-held devices. For example, manufacturing personnel are typically unable to apply a uniform amount of pressure to the manually activated hand-held devices. If insufficient pressure is applied, manufacturing personnel may drop and damage or lose small objects or may require several attempts before picking up small objects. Alternatively, manufacturing personnel sometimes use excessive pressure when activating the hand-held devices, and thereby cause the gripping elements of the device to bend, break, and become unusable. Excessive pressure application may also cause damage to some small objects or may cause manufacturing personnel to drop or lose small objects.

A need therefore exists for a device that eliminates or diminishes the likelihood that manufacturing personnel will suffer injuries to the wrist and hand while handling small objects during product manufacture and assembly. A need also exists for a device that allows manufacturing, personnel to apply a select, uniform amount of gripping pressure to the small objects so that the small objects are not dropped, damaged, or lost by manufacturing personnel.

SUMMARY OF THE INVENTION

The present invention includes a device for manipulating an object. The device includes a housing, first and second gripping members that are supported by the housing, an activating mechanism capable of causing movement of at least the first gripping member or the second gripping member to place the first gripping member and the second gripping member in gripping relation with the object, and an engagement mechanism that is supported by the housing. The first gripping member has a surface that defines a first bore or a first recess. The engagement mechanism is capable of engaging the first bore or first recess to selectively prevent movement of the first gripping member away from the activating mechanism. The present invention also includes a tweezer and methods for making the device and the tweezer. The present invention further includes a method of providing a tweezer with a replaceable gripping member.

BRIEF DESCRIPTION OF THE DRAWINGS

FIG. 1 is a side plan view of a device of the present invention for manipulating a small object.

FIG. 2 is a partial sectional view of a device of the present invention for manipulating a small object.

FIG. 3 is a sectional view taken along line 3—3 of FIG. 2.

FIG. 4 is an enlarged partial top plan view of the device of the present invention, showing the device holding a small object.

FIG. 5 is an enlarged partial side plan view of the device of the present invention, showing the device holding a small object.

FIG. 6 is an exploded perspective view of another device of the present invention for manipulating a small object.

FIG. 7 is a front plan view of a cartridge of the present invention for holding and arranging components of the device of the present invention.

FIG. 8 is a side plan view of the cartridge of FIG. 7.

FIG. 9 is a side plan view of another cartridge of the present invention.

FIG. 10 is a side plan view of another cartridge of the present invention.

DETAILED DESCRIPTION OF THE PREFERRED EMBODIMENTS

Figure 11:
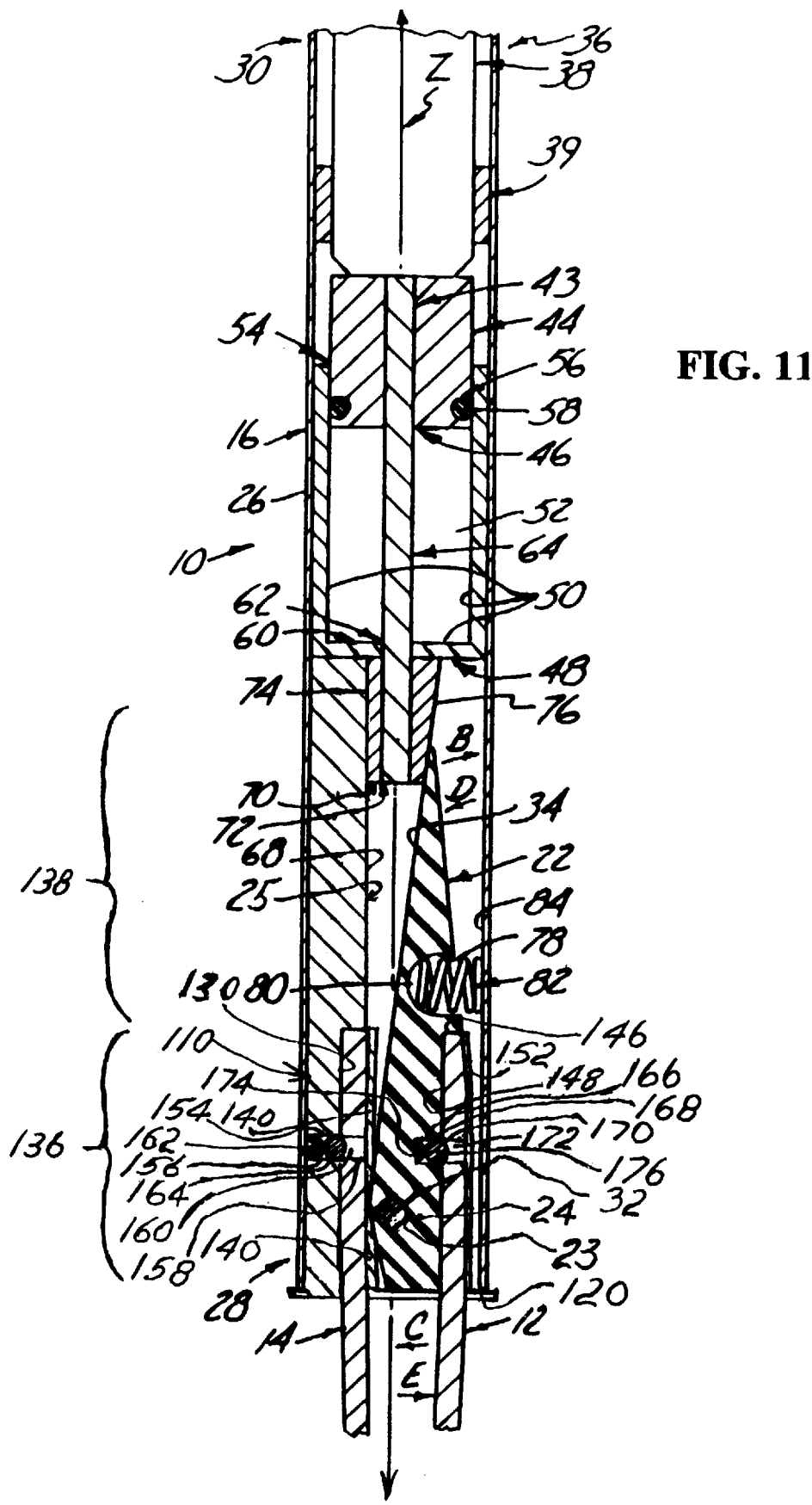
FIG. 11 is a partial sectional view of a device of the present invention.

A device of the present invention, such as a hand-held tweezer, for manipulating a small object (not shown) is generally indicated at 10 in FIG. 1. The device 10 includes a first gripping member 12 and a second gripping member 14. The device 10 also includes a structure, such as a housing 16, that supports the first gripping member 12 and the second gripping member 14 during gripping and handling of small objects. The first gripping member 12 and the second gripping member 14 are normally in a resting position, when not in use. At the resting position, a distal end 18 of the first gripping member 12 and a distal end 20 of the second gripping member 14 are separated by a distance A. When it is desired to grip the small object using the device 10, the distal ends 18, 20 of the first and second gripping members 12, 14 are moved closer together to reduce the distance A and place the distal ends 18, 20 in secure, gripping contact with grippable sides of the small object.

Throughout the drawings, like elements are referred to using like reference characters.

The device 10 of the present application greatly enhances the efficiency of manufacturing operations that require handling of very small objects, such as objects having grippable surfaces separated by distances on the order of about ten thousandths of an inch or less. Since the device eliminates the need for manual activation by manufacturing personnel, the device also eliminates or diminishes the likelihood that manufacturing personnel will suffer injuries to the wrist and hand while handling small objects during product manufacture and assembly. The device 10 allows manufacturing personnel to apply a select, uniform amount of gripping pressure to small objects, thereby minimizing or eliminating the likelihood that manufacturing personnel will drop, damage, or lose small objects during product manufacture and assembly.

The device 10 may be structured, as in FIG. 2, with the first gripping member 12 movable relative to the second gripping member 14 and with the second gripping, member 14 being stationary or fixed relative to the housing 16. To accomplish this, the first gripping member 12 may be attached to a movable mount 22 that is pivotally attached within the housing 16. The movable mount 22 has a surface 23 that defines a bore 24 through the mount 22. The bore 24 facilitates pivotal attachment of the mount 22 within the housing 16. The second gripping member 14 may be attached to a fixed mount 25 that is secured against movement within the housing 16.

The housing 16 may include an outer shell 26 that is circular in cross section and resembles a cylindrical tube. The cylindrical nature of the shell 26 is believed to enhance the ability of manufacturing personnel to dexterously grasp and use the device 10. The outer shell 26 includes both a distal end 28 and a proximal end 30. The outer shell 26 and FIG. 2 shows the shell has a constant diameter throughout its length is centered about a longitudinal axis Z that extends through the shell 26. The housing 16 includes a pivot pin 32 that is fixedly mounted in transverse relation to the Z axis within the shell 26. The pivot pin extends through the bore 24 of the movable mount and permits pivoting motion of the movable mount 22 about the pin 32. The pivot pin 32 and the bore 24 of the movable mount 22 may be positioned on any side of the Z axis or may intersect the Z axis. The outer shell 26 and the pivot pin 32 may be made of any material, such as metal, that is capable of standing up under repetitive use. Also, a grippable layer or coating 33, such as a flexible polymeric foam coating (not shown), may be applied to an outer surface of the shell 26 to provide a comfortable, slip resistant surface the manufacturing personnel can use for holding the device.

The fixed mount 25 is secured within the housing 16 with the second gripping member 14 extending from the distal end 28 of the shell 26. The movable mount 22 is pivotally mounted on the pivot pin 32 with an angular surface 34 of the mount 22 facing the fixed mount 25. The angular surface 34 is closest to the fixed mount 25 proximate the distal end 28 of the shell 26 and smoothly slopes away from the fixed mount 25 from the distal end of the shell 26 toward the proximal end 30 of the shell 26. The first gripping member 12 extends from the distal end 28 of the shell 26 so that the members 12, 14 are separated from each other by the distance A when the members 12, 14 are in the resting position. The gripping members 12, 14 and the mounts 22, 25 may be made of any material, such as metal, that is capable of standing up under repetitive use.

The device 10 also includes an activating or movement mechanism 36. The movement mechanism 36 may include an air cylinder 38 that is secured within the proximal end 30 of the shell 26. The cylinder 38 may be secured within the shell 26 using a fixed cylinder mount 39, or any other conventional mounting structure. The air cylinder 38 may be attached to a source 40 of pressurized air through a suitable adaptor and tubing assembly 41, as depicted in FIG. 1. Manufacturing personnel may selectively activate and deactivate the source 40 of pressurized air, to activate or deactivate the movement mechanism 38, by actuating a suitable hand or foot operated switch 42 that is operably connected to the source 40 of pressurized air. The cylinder 38 is preferably a single action, spring-return type cylinder, such as a Model SM3-7 air cylinder that is available from Clippard Instrument Laboratory, Inc. of Cincinnati, Ohio. One suitable foot operated switch 42 is a Model 3B-30A2S foot switch that is available from The Linemaster Switch Corp. of Woodstock, Conn.

The cylinder 38 includes a conventional internal piston (not shown) with an attached rod 43, as in FIG. 2, that extends out of the cylinder 38 along the Z axis toward the distal end 28 of the shell 26. The movement mechanism 36 also includes a piston 44 having a bore 46 that extends through the piston 44 along the Z axis. The piston 44 is mounted on the rod 43 with the rod 43 extending about half way through the bore 46. The piston 44 may be made of any material, such as metal, that is capable of standing up under repetitive use.

The movement mechanism 36 also includes a cylindrical drum 48 that is secured within the outer shell 26, between the air cylinder 38 and the mounts 22, 25. The cylindrical drum 48 includes internal surfaces 50 that define a chamber 52 and also includes an open end 54 that faces the air cylinder 38. The piston 44 is slidably positioned within the chamber 52. The piston 44 includes an annular race 56 and a polymeric O-ring 58 that is disposed within the annular race 56. The O-ring 58 remains in contact with the internal surfaces 50 of the drum 48 to prevent fluid, such as air, from escaping out of drum 48 via the open end 54 of the drum. The drum 48 may be made of any material, such as metal, that is capable of standing up under repetitive use.

The drum 48 also includes a closed end 60 having a bore 62 that extends along the Z axis. The movement mechanism 36 includes a rod 64 that extends from outside the drum 48, through the bore 62, and into the bore 46 of the piston 44 to closely confront the rod 43. The rod 64 is fixed relative to the rod 43 and the piston 44. Preferably, the rod 64 closely confronts the surface that defines the bore 62 so that fluid, such as air, located within the chamber 52 is not able to escape through the bore 62.

The fixed mount 25 that secures the second gripping member 14 extends from the closed end 60 of the drum 48 to the distal end 28 of the shell 26. The surfaces 34 and 76 are planar, as shown, and an imaginary line extends on and along surface 76 and in the direction of the angulation shown. The fixed mount 25 includes an inner surface 68 that faces the Z axis. The movement mechanism 36 further incorporates a wedge member 70 that has a longitudinal bore 72, a guide surface 74, and an angular surface 76. The surfaces 34 and 36 are planar, as shown, and an imaginary line extends on and along the surfaces 76 and in the direction of the angulation shown. The portion of the rod 64 that is located outside of the drum 48 extends into and is secured within the bore 72 of the wedge member 70. The guide surface 74 is positioned to closely confront and slide along the inner surface 68 of the fixed mount 25, between the closed end 60 of the drum 48 and the distal end 28 of the shell 26. The angular surface 76 of the wedge member 70 is positioned to engage and slide along the angular surface 34 of the movable mount 22. The wedge member 70 may be made of any material, such as metal, that is capable of standing up under repetitive use.

Activation of the movement mechanism 36 moves the piston 44, the rod 64, and the wedge member 70 linearly toward the distal end 28 of the shell 26. Activation of the movement mechanism 36 causes fluid pressure to build up in the drum 48. Activation of the movement mechanism 36 also causes the angular surface 76 of the wedge member 70 to slide along the angular surface 34 of the movable mount 22. As the wedge member 70 moves linearly toward the distal end 28 of the shell 26, the wedge member 70 causes the movable mount 22 to pivot about the pivot pin 32 in the direction of arrow B. The pivoting movement of the movable mount 22 in the direction of arrow B results in movement of the first gripping member 12 in the direction of arrow C toward the second gripping member 14 and enables the device 10 to grip the small object between the first gripping member 12 and the second gripping member 14.

The movable mount 22 preferably includes an internal surface 78 that defines a recess or cavity 80. The device 10 includes a compressible spring 82 that rests against the movable mount 22 within the cavity 80 and against an internal surface 84 of the shell 26. The spring 82 serves to bias the movable mount 22 against the wedge member 70. Biasing the mount 22 against the wedge member 70 maintains the first gripping member 12 and the second gripping member 14 in the resting position separated by the distance A when the wedge member is in contact with the closed end 62 of the drum 48. Biasing the mount 22 against the wedge member 70 also permits smooth, steady movement of the first gripping member 12 toward the second gripping member 14, upon activation of the movement mechanism 36, and smooth, steady movement of the first gripping member 12 away from the second gripping member 14, upon deactivation of the movement mechanism 36. The compressible spring 82 may be made of any material, such as metal, that is capable of standing up under repetitive use.

Activation of the movement mechanism 36 moves the wedge member 70 linearly toward the distal end 28 of the shell 26, which causes the movable mount 22 to pivot about the pivot pin 32 in the direction of arrow B and compresses the spring 82. Movement of the mount 22 in the direction of arrow B also causes the first gripping member 12 to move in the direction of arrow C toward the second gripping member 14. When the first gripping member 12 moves in the direction of arrow C, the distal end 18 of the first gripping member 12 travels along a circular arc F. The radius of the arc F has a length (not shown) equal to the distance between the distal end 18 and the center of the pivot pin 32 depicted in FIG. 2.

Deactivation of the movement mechanism 36, such as by turning off the source 40 of pressurized air and venting the assembly 41, causes the wedge member 70 to move linearly toward the proximal end 30 of the shell 26 and into contact with the drum 48. The drum 48 acts as a cushion to help prevent deformation of the ends 18 and 20. However, the drum is not a necessary component and may be eliminated. Movement of the wedge member 70 toward the proximal end 30 allows the spring 82 to expand and force the moveable mount 22 toward the fixed mount 25 in the direction of arrow D. This pivoting movement of member 22 in the direction of arrow D causes the first gripping member 12 to move away from the second gripping member 14 in the direction of arrow E. When the first gripping member 12 moves in the direction of arrow E, the distal end 18 of the first gripping member 12 travels along the circular arc F, as depicted in FIG. 1.

The linear motion of the movement mechanism 36 coupled with the rotational motion of the movable mount 22 about the pivot pin 32 permits the device 10 to be relatively compact in size. For example, in one embodiment of the device 10, the shell 26 has an internal diameter G of about 9 millimeters and a length H of about 97 millimeters. Other embodiments of the device 10 are envisioned wherein the internal diameter G of the shell 26 may range down to about 6 millimeters. Also, other embodiments of the device 10 are envisioned wherein the internal diameter G of the shell 26 may be larger than 9 millimeters.

The ability to construct the device 10 with a relatively small shell 26 internal diameter allows manufacturing personnel to easily and securely hold and position the device 10. For example, manufacturing personnel may grip the device 10 using only two or three fingers that are positioned proximate the distal end 28 of the shell 26 and with the shell 26 resting in the valley formed between the thumb and the first finger, similar to the way one would hold a writing implement, such as a pencil. As another example, manufacturing personnel may grip the device 10 using two or more fingers that are positioned along the shell 26 so that the hand is located either predominantly above or below the shell 26. This ability to securely hold the device 10 allows manufacturing personnel to precisely position and hold the distal ends 18, of the gripping members 12, 14 for quickly and easily picking up and securely holding small objects during manufacturing operations. The ability to securely hold the device 10 also allows manufacturing, personnel to accurately position small objects during manufacturing operations.

The linear motion of the movement mechanism coupled with the rotational motion of the movable mount 22 about the pivot pin 32 also permits other aspects of the device 10 to be relatively small in size. For example, in one embodiment of the device 10, the distance A between the distal ends 18, 20 of the gripping members 12, 14 is about 2.5 millimeters. Also, other embodiments of the device 10 are envisioned wherein the distance A may be larger than 2.5 millimeters. The ability to construct the device 10 with the relatively small distance A separating the distal ends 18, 20 of the device 12, 14 allows manufacturing personnel to accurately position the ends 18, 20 proximate small objects prior to activating the movement mechanism 36 and picking up the small objects.

The device 10 of the present invention may alternatively be constructed so that both the first and the second gripping members 12, 14 are moveable, relative to the housing 16 and relative to each other. However, to reduce the number of moving parts and realize other advantages of the present invention, the device 10 is preferably structured, as in FIG. 2, with the first gripping member 12 movable relative to the second gripping member 14 and the housing 16 and with the second gripping member 14 being fixed relative to the housing 16.

It has been found that by making the member 12 movable relative to the housing 16 and the member 14 fixed relative to the housing 16, the device 10 can be used to more easily and reliably pick up small objects, as compared to when the members 12, 14 are both movable relative to the housing 16. For example, the member 14 that is fixed may be placed against a grippable surface of the small object, and the member 12 that is movable may be smoothly guided into position against another grippable surface of the small object by actuating the movement mechanism 36. If the members 12, 14 are both moveable relative to the housing 16, special care and a very steady hand is required to pick up the small object, particularly when each grippable surface of the small object has a very small surface area on the order of 4 mm$^2$ or less. Fixing the member 14, as opposed to making the member 14 moveable, significantly decreases the number of movement variables that must be balanced when picking up the small object. This reduction of movement variables has been found especially beneficial when the grippable surfaces of the small object are separated by a distance on the order of ten thousandths of an inch or less and when grippable surfaces of the small object each have very small surface areas on the order of 4 mm$^2$ or less.

Though the outer shell 26 is described as being circular in cross-section, the outer shell 26 may have any cross-sectional shape. Also, though the movement mechanism 36 has been characterized as including the air cylinder 38, it is to be understood that other suitable driver mechanisms may be substituted in place of the air cylinder 38. For example, a solenoid (not shown) may be substituted in place of the air cylinder 38, the piston 44, and the cylindrical drum 48. The wedge member 70 would be attached to the solenoid so that activation of the solenoid moves the wedge member 70 along the angular surface 34 of the moveable mount 22 toward the distal end 28. Conversely, deactivation of the solenoid would cause the wedge member 70 to move along the angular surface 34 of the moveable mount 22 toward the proximal end 30.

When the movement mechanism 36 incorporates the air cylinder 38, it is believed that the highest pressure supplied to the air cylinder 38 should not exceed about 40 pounds per square inch gauge (psig). Pressures above about 40 psig would be expected to cause the first and second gripping members 12, 14 to exert enough force on small objects to potentially cause damage to at least some of the small objects. Also, pressures above about 40 psig may cause deformation, breakage, or excessive wear of the first and second gripping members 12, 14.

The device 10 of the present invention greatly enhances the efficiency of manufacturing operations that require handling of very small objects, such as a hearing aid component 84, as depicted in FIG. 4. As depicted in FIG. 5, very small objects, such as the hearing aid component 84, have a pair of grippable surfaces 86, 88 that may be grasped when it is desired to pick up the component 84. The distance separating the grippable surfaces 86, 88 may be characterized as a gripping dimension I. The first gripping member 12 and the second gripping member 14 have respective gripping surfaces 90, 92 that face each other.

Referring back to FIG. 2, activation of the movement mechanism 36 causes the first gripping member 12 to move in the direction of arrow C toward the second gripping member 14 until, as best depicted in FIG. 5, the gripping surface 90 of the first gripping member 12 is in contact with the grippable surface 86 and the gripping surface 92 of the second gripping member 14 is In contact with the grippable surface 88. Thus, activation of the movement mechanism 36 causes the distance A separating the first gripping member 12 and the second gripping member 14, as in FIG. 1, to be changed to the gripping dimension I, as in FIG. 5, when the members 12, 14 grip the small object, such as the hearing aid component 84.

The second gripping member 14 also includes a non-gripping surface 94 located on a side of the second gripping member 14 opposite the gripping surface 92. The distal end 20 of the second gripping member 14 is tapered so the surfaces 92, 94 approach each other at an angle J and meet at a tip 96 of the second gripping member 14. The tip 96 allows the distal end 20 of the gripping member 14 to be easily inserted beneath the small object and into contact with the grippable surface 84, prior to activation of the movement mechanism 36. It has been found that the distal end 20 slides easily beneath the small object when the angle J between the surfaces 92, 94 is about twenty degrees or less. Preferably, the angle J is about ten degrees or less, since it has been found that the distal end 20 slides more easily beneath the small object when the angle J is about ten degrees or less.

Additionally, the non-gripping surface 94 is sloped so the non-gripping surface 94 and an outside lower surface 98 of the device 10 define an angle K. It has been found that at particular values of the angle K, manufacturing personnel are able to stabilize their hands (not shown) against a manufacturing surface 100 while gripping the device 10 and while maintaining the non-gripping surface 94 flush against the manufacturing surface 100. This ability to maintain the surface 94 flush against the surface 100 minimizes or eliminates jerking movements of the distal end 20 during placement of the distal end 20 beneath the small object. When the hand used to hold the device 10 is predominantly located above the device 10, it has been found that the angle K may range from about ten to about twenty degrees when the hand is supported on the surface 100 to help stabilize movements of the device 10. When the hand used to hold the device 10 is predominantly located below the device 10, it has been found that, depending upon the position of the fingers on the shell 26, the angle K may range from about ten to about forty-five degrees when the hand is supported on the surface 100 to help stabilize movements of the device 10.

The gripping surface 90 and the gripping surface 92 are preferably substantially parallel to each other when the first gripping member 12 and the second gripping member 14 are gripping the small object. Also, the distal end 18 of the first gripping member 12 preferably extends farther away from the distal end 28 of the shell 26 than the distal end 20 of the second gripping member 14 when the first gripping member 12 and the second gripping member 14 are gripping the small object. This orientation of the surfaces 90, 92 and of the distal ends 18, 20 has been found to provide the device 10 with an optimal ability to pick up and hold certain small objects, especially those objects where the gripping dimension I is on the order of ten thousandths of an inch or less.

When it is desired to release the small object, such as the hearing aid component 84, from the device 10, the movement mechanism 36 may be deactivated to allow expansion of the spring 82 and pivoting movement of the mount 22 in the direction of arrow D. This pivoting movement of the mount 22 in the direction of arrow D causes the first gripping member 12 to move in the direction of arrow E away from the second gripping member 14, with the consequent effect that the small object is released from the grasp of the first and second gripping members 12, 14. Thus, deactivation of the movement mechanism 36 causes the distance separating the members 12, 14 to change from the gripping dimension I, as in FIG. 5, to the distance A, as in FIG. 1.

The device 10 of the present invention has been found to be surprisingly useful for picking up and holding small objects, such as the hearing aid component 84, having a variety of gripping dimensions, such as the gripping dimension I, ranging up to about 3/16 inches. The device 10 has been found to be particularly useful for gripping and manipulating small objects that have grippable dimensions, such as the gripping dimension I, ranging up to about 3/16 inches. The device 10 has been found to be especially suited for gripping small objects, such as the hearing aid component 84, having grippable dimensions, such as the gripping dimension I, on the order of about ten thousandths of an inch or less.

It has been discovered that the device 10 is highly capable of reliably picking, up small objects, such as the hearing aid component 84, on the first attempt and holding small objects, either for short periods of time or for longer periods of time, without dropping or damaging the small objects. This is believed attributable to several aspects of the invention. For example, the device 10 permits the first and second gripping members 12, 14 to grip the small objects with a select, uniform amount of force. Also, the device 10 includes the select angle J between the surfaces 92, 94 and the tip 96 that allow the distal end 20 of the gripping member 14 to be easily inserted beneath the small object and into contact with the grippable surface 88. The device 10 also includes the select angle K between the non-gripping surface 94 and the outside lower surface 98 of the device 10 that allows manufacturing personnel to stabilize their hands against the manufacturing surface 100 while gripping the device 10 and maintaining the non-gripping surface 94 flush against the manufacturing surface 100.

The device 10 of the present application also greatly enhances the efficiency of manufacturing operations that require handling of very small objects, such as objects having grippable surfaces separated by distances on the order of about ten thousandths of an inch or less. Additionally, the device 10 eliminates or diminishes the likelihood that manufacturing personnel will suffer injuries to the wrist and hand while handling small objects during product manufacture and assembly.

In one preferred embodiment of the device of the present invention, such as the device 10, the first and second gripping members 12, 14 are selectively releasable from the device 10 to permit replacement of the first gripping member 12 and/or replacement of the second gripping member 14. This construction and capability of the device of the present invention is beneficial, since the normal wear and tear of everyday use, or mishandling by the operator, may cause the gripping members 12, 14 to become bent, worn, or otherwise unusable for reliably and securely picking up small objects. Additionally, there may be a desire to switch different gripping members into the device 10 in place of the gripping members 12, 14, depending upon the operation to be performed by the device 10.

The capability of selectively replacing gripping member 12 and/or gripping member 14 in the device 10 is enabled by use of a cartridge 110, as best depicted in FIG. 6. The cartridge 110 serves as a carrier for gripping members 12, 14 and for the movable mount 22. A pair of surfaces 112 of the cartridge 110 define bores 114 for accepting the pivot pin 32. The pivot pin 32 extends through one of the bores 114, through the bore 24 of the movable mount 22, and through the other bore 114 of the cartridge 110 to pivotally mount the movable mount 22 with respect to the cartridge 110 and with respect to the housing 16 in which the cartridge 110 is positioned.

The cartridge 110 includes both a distal end 116 and a proximal end 118. Additionally, the cartridge includes a lip 120 at the distal end 116. The lip 120 has a diameter that is larger than the diameter of the housing 16, to prevent insertion of the lip 120 into the housing 16. The diameter of the cartridge, away from the lip 120, is slightly smaller than the internal diameter of the housing 16 to permit sliding insertion of the cartridge 110 into the housing 16. However, the diameter of the cartridge 110, though somewhat smaller than the internal diameter of the housing 16, should be very close to the internal diameter of the housing 16 so that the static coefficient of friction between the cartridge 110 and the housing 16 is sufficient to resist movement of the cartridge 110 with respect to the housing 16, except in those instances when it is desired to manually remove the cartridge 110 from the housing 16 for purposes of changing one or both of the gripping members 12, 14. The lip 120 of the cartridge 110 abuts against the distal end 28 of the outer shell 26 to limit how far the cartridge 110 may be pushed into the housing 16.

The cartridge 110 includes internal surfaces 122 that cooperatively define a recess 124 in the cartridge 110. The recess 124 includes both a fixed gripping member support portion 126 and a movable gripping member support portion 128. The internal surfaces 122 of the cartridge 110 include base surface(s) 130, side surfaces 132, and side surfaces 134. Gripping members 12, 14 and the movable mount 22 are held within the recess 124 of the cartridge 110, as explained more fully below.

When used with the cartridge 110, the gripping member 14 has a thickness L. As depicted in FIG. 7, the base surface 130 of the cartridge 110 may include a distal portion 136 and a proximate portion 138 that are at different elevations within the cartridge 110. The distal portion 136 of the base surface 130 and the proximate 138 of the base surface 130, as depicted in FIG. 8, may be separated from each other by a distance M. This distance M may be slightly greater than the thickness L of the gripping member 14. Alternatively, as depicted in FIG. 9, the distance M may be such that the distal portion 136 of the base surface 130 and the proximate portion 138 of the base surface are spaced apart from each other while making the distance M less than the thickness L of the gripping member 14. As still another alternative, the distal portion 136 and the proximate portion 138 may be located, as best depicted in FIG. 10, so that the portions 136, 138 of the base surface 130 are not separated by the distance M, but instead are continuous with each other.

In the versions of the cartridge 110 that are depicted in FIGS. 8, 9, and 10, the positioning of the gripping member 14 within the recess 124 is indicated with dashed lines, as are the locations of the distal portion 136 and the proximate 138 of the base surface 130. In the versions of the cartridge 110 depicted in FIGS. 9 and 10, the gripping member 14 acts as a stop that prevents further movement of the wedge member 70 toward the distal end 28 of the outer shell 26 (not shown in FIGS. 9–10) after the cartridge 110 has been inserted in the housing 16 (not shown in FIGS. 9–10).

Returning to FIG. 6, the cartridge 110 additionally includes facing ledges 140 proximate the recess 124. The facing ledges 140 extend from the distal end 116 of the cartridge 110 toward the proximal end 118 of the cartridge 110. However, to prevent the facing ledges 140 from prematurely interfering with movement of the wedge member 70 prior to full activation of the first gripping member 12, the facing ledges 140 do not overlap with the proximal portion 138 of the bottom surface 130, but instead extend into the cartridge 110 only so far as the second gripping member 14 is to be inserted into the cartridge 110.

When the distance M (not shown in FIG. 6) between the distal portion 136 of the bottom surface 130 and the proximate portion 138 of the bottom surface 130 is slightly larger than the thickness L of the gripping member 14, the ledges 140 are spaced from the base surface 130 of the cartridge 110 to permit positioning of the gripping member 14 between the base surface 130 and the ledges 140 while maintaining contact between the ledges 140 and a surface 141 of the gripping member 14. The ledges 140 prevent the gripping member 14 from moving away from the bottom surface 130 in the direction of the ledges 140 and thereby provide a fixed gripping member recess. However, the ledges 140 are preferably each spaced far enough above the bottom surface 130 of the recess 124 to maintain the ledges 140 and the bottom surface 130 in contact with the gripping member 14, without creating excessive static or dynamic coefficients of friction that prevent selectively initiated sliding of the gripping member 14 along the bottom surface 130 and out of the cartridge 110.

Alternatively, opposing sides 142 of the gripping member 14 may include longitudinal surfaces (not shown) that define longitudinal grooves 144 (not shown in FIG. 6). In this version of the gripping member 14, the ledges 140 are spaced from the base surface 130 to maintain the gripping member 14 in contact with the base surface 130 while permitting the ledges 140 to engage the grooves 144.

The movable mount 22 that is positioned within the cartridge 110 includes side surfaces 146 and a bottom surface 148 that define a recess 150 of the mount 22. The mount 22 additionally includes a pair of ledges 152 that are located above the side surfaces 146. The ledges 152 are spaced apart from the bottom surface 148 of the mount 22 to permit insertion of the gripping member 12 in contact with and between the ledges 152 and the bottom surface 148 of the mount 22 in the recess 150. The ledges 152 prevent the gripping member 12 from moving away from the bottom surface 148 in the direction of the ledges 152. However, the ledges 152 are preferably each spaced far enough above the bottom surface 148 of the mount 22 to maintain the ledges 152 and the bottom surface 148 in contact with the gripping member 12, without creating excessive static or dynamic coefficients of friction that prevent selectively initiated sliding of the gripping member 12 along the bottom surface 148 and out of the mount 22.

Figure 12:
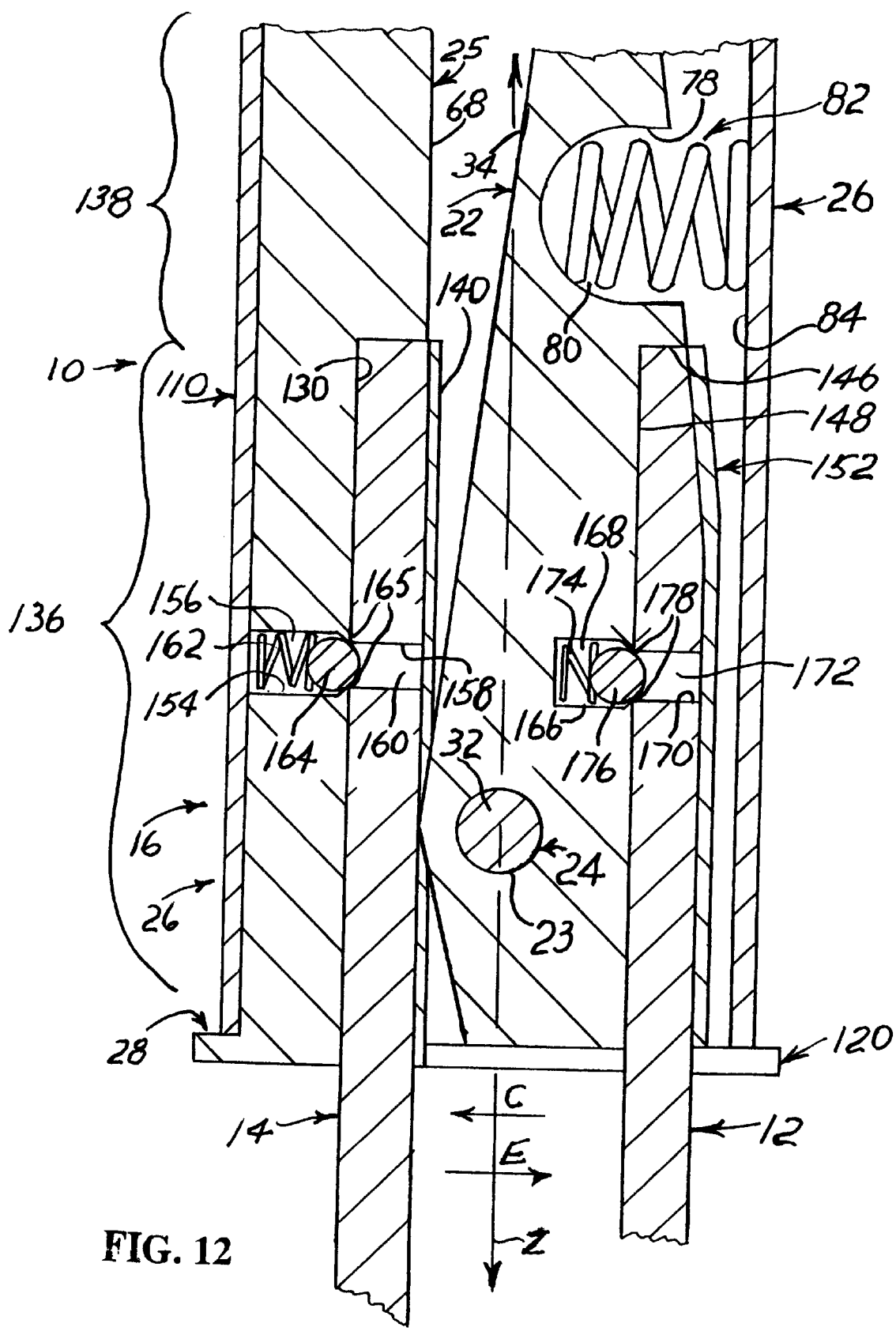
FIG. 12 is an enlarged partial sectional view of a device of the present invention.

As depicted in FIG. 11, the cartridge 110 includes a surface 154 that defines a recess or a bore 156. Additionally, the gripping member 14 includes a surface 158 that defines a recess or bore 160. As best depicted in FIG. 12, a spring 162 is mounted within the bore 156 of the cartridge 110 along with an engagement member, such as a ball 164. When the gripping member 14 is inserted into the recess 124 (not shown in FIG. 12), the bores 156, 160 are pushed into alignment with each other. The spring 162 partially forces the ball 164 into the bore 160 of the gripping member 14 to secure the gripping member 14 in the cartridge 110 and prevent movement of the gripping member 14 along the axis Z of the device 10. As previously explained, the ledges 140 cooperate with the base surface 130 of the cartridge 110 to further help in fixedly maintaining the gripping member 14 within the recess 124 of the cartridge 110.

The diameter of the bore 160 may be slightly smaller than the diameter of the ball 164 to allow engagement of the ball 164 with the bore 160 without permitting the ball 164 to move fully into the bore 160 of the gripping member 14. Alternatively, to prevent the ball 164 from falling out of the bore 156, the bore 156 may include a thin lip 165 that is located within the bore 156 at the interface of the bores 156, 160. The thin lip 165 should have an internal diameter slightly less than the diameter of the ball 164 to prevent the ball 164 from fully exiting the bore 156, while permitting part of the ball 164 to engage the bore 160. The pressure exerted by the spring 162 on the ball 164 should be sufficient to maintain the gripping member 14 within the cartridge 110, absent application of a preselected amount of force on the gripping member 14 along the axis Z and away from the housing 16 and pivot pin 32 for purposes of removing the gripping member 14 from the cartridge.

As depicted in FIG. 11, the mount 22 also includes a surface 166 that defines a recess or a bore 168. Additionally, the gripping member 12 includes a surface 170 that defines a recess or bore 172. As best depicted in FIG. 12, a spring 174 is mounted within the bore 168 of the mount 22 along with an engagement member, such as a ball 176. When the gripping member 12 is inserted into the recess 150, the bores 168, 172 are pushed into alignment with each other. The spring 174 partially forces the ball 176 into the bore 172 of the grippingmember 12 to secure the gripping member 12 in the cartridge 110 and the mount 22 and prevent movement of the gripping member 12 along the axis Z of the device 10. As previously explained, the ledges 152 cooperate with the bottom surface 148 of the recess 150 to further help in fixedly maintaining the gripping member 12 within the recess 150 of the mount 22.

The diameter of the bore 172 may be slightly smaller than the diameter of the ball 176 to allow engagement of the ball 176 with the bore 172 without permitting the ball 176 to move fully into the bore 172 of the gripping member 12. Alternatively, to prevent the ball 176 from falling out of the bore 168, the bore 168 may include a thin lip 178 that is located within the bore 168 at the interface of the bores 168, 172. The thin lip 178 should have an internal diameter very slightly less than the diameter of the ball 176 to prevent the ball 176 from fully exiting the bore 168, while permitting part of the ball 176 to engage the bore 172. The pressure exerted by the spring 174 on the ball 176 should be sufficient to maintain the gripping member 12 within the cartridge 110 and the mount 22, absent application of a preselected amount of force on the gripping member 12 along the axis Z and away from the housing 16 and pivot pin 32 for purposes of removing the gripping member 12 from the cartridge 110.

To assemble the cartridge 110; gripping members 12, 14; and movable mount 22 within the device 10, gripping member 14 is placed in the cartridge 110 by sliding the gripping member 14 into the recess 124 between the ledges 140 and the base surface 130. The gripping member 14 is pushed into the recess 124 until the bores 156, 160 come into alignment and the spring 162 forces the ball 164 into engagement with the bore 160 of the gripping member 14.

Returning to FIG. 6, the movable mount 22 is positioned in the cartridge 110 by positioning the bore 24 in alignment with the bores 114, with the recess 150 of the mount 22 facing away from the base surface 130 of the cartridge 110. The pivot pin 32 is then inserted through the bores 114 and the bore 24. The pivot pin 32 should fit snug enough within the bores 114, 24 to prevent the pivot pin 32 from easily sliding out of the bores 114, 24 prior to positioning of the cartridge 110 within the housing 16. After the cartridge 110 is positioned within the housing 16, the housing 16 prevents the pivot pin 32 from shifting within the bores 114, 24.

As best depicted in FIGS. 6 and 12, the gripping member 12 is positioned within the movable mount 22 by sliding the movable mount 12 into the recess 150 between the bottom surface 148 and the ledges 152 until the bores 168, 172 come into alignment and the spring 174 forces the ball 176 into engagement with the bore 172. Alternatively, the gripping member 12 may be positioned within the recess 150 of the mount 22 prior to attachment of the mount 22 within the cartridge 110.

The cartridge 110, with the attached gripping members 12, 14 and movable mount 22, may then be slid into the housing 16 to position the gripping members 12, 14 in the device 10 for use of the device 10 in securely picking up small objects. Additionally, the cartridge 110 may be positioned in the housing 16 after attachment of only the movable mount 22 to the cartridge 110. Thereafter, the gripping members 12, 14 may be positioned within the recesses 150, 124, respectively, after the cartridge 110 and attached mount 22 have been positioned in the housing 16.

Thus, either or both of the mounts 12, 14 may be removed and replaced within the cartridge 110 while the cartridge 110 remains in place within the housing 16.

With the cartridge 110, gripping members 12, 14 and movable mount 22 positioned within the housing 16, the device 10 is ready for operation. The cartridge 110 serves as the fixed mount 25, with the proximate portion 138 of the base surface 130 serving as the inner surface 68 of the fixed mount 25 that guides the wedge member 70 and facilitates sliding movement of the angular surface 76 of the wedge member 70 along the angular surface 34 of the mount 22 to effect pivoting motion of the gripping member 12 toward the gripping member 14 and into the gripping position, as previously described. The ledge 140 limits movement of the wedge member 70 along the axis Z of the housing 16 to help prevent application of excess pressure on the gripping surfaces 90, 92 (not shown in FIG. 12) of the gripping members 12, 14. Alternatively, as best depicted in FIGS. 8 and 9, the gripping member 14 may cooperate with, or act in place of, the ledge 140 for purposes of limiting movement of the wedge member 70 along the Z axis and away from the cylinder 38 (not shown in FIGS. 8–9).

If it is desired to replace the gripping member 12 and/or the gripping member 14, this can be accomplished with the cartridge 110 located either in the housing 16, as depicted in FIG. 12, or removed from the housing 16. When it is desired to remove the gripping member 12 and/or the gripping member 14 while the cartridge 110 remains within the housing 16, the bores 156, 168 preferably include the aforementioned lips 165, 178, respectively, to prevent the balls 164, 176 from falling out of the bores 156, 168, respectively, after the gripping members 12, 14 are removed from the cartridge 110. With the cartridge 110 located within the housing 16, the gripping member 12 is grasped and pulled away from the mount 22 in the direction of the Z axis with enough force to disengage the ball 176 from the bore 172 by forcing the ball 176 fully into the bore 168. The gripping member 12 can then be fully removed from the mount 22 with continued manual pressure. A new gripping member 12 may then be inserted into and secured within the mount 22 via the previously described steps.

Similarly, with the cartridge 110 located within the housing 16, the gripping member 14 is grasped and pulled away from the cartridge 110 in the direction of the Z axis with enough force to disengage the ball 164 from the bore 160 by forcing the ball 164 fully into the bore 156. The gripping member 14 can then be fully removed from the cartridge 110 with continued manual pressure. A new gripping member 14 may then be inserted into and secured within the cartridge 110 via the previously described steps. Alternatively, the cartridge 110 may be removed from the housing 16 before the gripping member 12 and/or the gripping member 14 are removed and replaced.

All of the present invention has been described with respect to preferred embodiments, workers skilled in the art will recognize that changes may be made in form and detail without departing from the spirit and scope of the present invention.

What is claimed is:

1. A device for manipulating an object, the device comprising:

a housing;

a first gripping member supported by the housing, the first gripping member having a surface that defines a first bore or a first recess;

a second gripping member supported by the housing;

an activating mechanism capable of causing movement of at least the first gripping member or the second gripping member to place the first gripping member an the second gripping member in gripping relation with the object;

an engagement mechanism supported by the housing, the engagement mechanism capable of engaging the first bore or first recess to selectively prevent movement of the first gripping member away from the activating mechanism; and the engagement mechanism further comprises a spring and an engagement member, the spring capable of forcing the engagement member into engagement with the first bore or the first recess.

2. The device of claim 1, wherein the engagement member comprises a ball.

3. The device of claim 2 wherein a diameter of the ball is larger than a diameter of the first bore or first recess.

4. The device of claim 1 wherein the engagement mechanism further comprises a surface that defines a second bore or a second recess, the spring positioned within the second bore or the second recess.

5. The device of claim 4 wherein the spring is disposed in contact with the engagement member and is arranged to be capable of forcing the engagement member into engagement with the first bore or the first recess.

6. The device of claim 1 wherein the first gripping member is a movable gripping member and the second gripping member is a fixed gripping member and wherein the first gripping member is capable of being moved toward the second gripping member to grip the object between the first gripping member and the second gripping member.

7. The device of claim 1, the device further comprising:

a first mount, the first gripping member attached to the first mount and the first mount is in working relation with the activating mechanism; and a support, the first mount pivotally attached to the support.

8. The device of claim 7 wherein the engagement mechanism further comprises a surface that defines a second bore or a second recess, the spring positioned within the second bore or the second recess.

9. The device of claim is 7, the device further comprising a wedge member, the wedge member operably connected to the activating mechanism and in slidable contact with the first mount.

10. The device of claim 9 wherein the activating mechanism is capable of moving the wedge member relative to the first mount to cause pivoting movement of the first mount about the support.

11. A power tweezer for gripping a small object, the power tweezer comprising:

an activating mechanism;

a movable gripping member, the activating mechanism in working relation with the movable gripping member;

a fixed gripping member, the fixed gripping member in working relation with the movable gripping member and the movable gripping member is capable of being moved toward the fixed gripping member to grip the small object between the movable gripping member and the fixed gripping member;

an engagement mechanism in working relation with the movable gripping member or the fixed gripping member, the engagement mechanism comprising:

a surface of the movable gripping member or the fixed gripping member, the surface defining a first bore or a first recess;

an engagement member; and a spring, the spring capable of forcing the engagement member into engagement with the first bore or the first recess.

12. The device of claim 11 wherein the engagement mechanism further comprises a surface that defines a second bore or a second recess, the second bore or second recess substantially in alignment with the first bore or recess and the spring positioned within the second bore or the second recess.

13. A tweezer for gripping an object, the tweezer comprising:
a first gripping member having a surface that defines a first bore or a first recess;
a second gripping member in working relation with the first grippping member;
an activating mechanism capable of causing movement of at least the first gripping member or the second gripping member to place the first gripping member and the second gripping member in gripping relation with the object;
a cartridge that supports at least the first gripping member or the second gripping member;
an engagement mechanism supported by the cartridge, the engagement mechanism comprising:
an engagement member; and
a spring, the spring capable of forcing the engagement member into engagement with the first bore or the first recess.

14. The tweezer of claim 13 wherein the engagement mechanism further comprises a surface of the cartridge that defines a second bore or a second recess in the cartridge, the spring located in the second bore or recess.

15. The tweezer of claim 14 wherein the second bore or second recess is substantially in alignment with the first bore or recess.

16. The tweezer of claim 14 wherein the engagement member comprises a ball.

17. The tweezer of claim 13 Wherein the first gripping member is a movable gripping member and the second gripping member is a first gripping member and wherein the first gripping member is capable of being moved toward the second gripping member to grip the object between the fixed gripping member and the second gripping member.

18. The tweezer of claim 13, the tweezer further comprising:
a first mount, the first gripping member attached to the first mount and the first mount in working relation with the activating mechanism; and the first mount pivotally attached to the cartridge.

19. The tweezer of claim 18 wherein the first mount comprises a surface that defines a second bore or a second recess, the spring positioned within the second bore or the second recess.

20. The tweezer of claim 13, the tweezer further comprising a housing, the cartridge positioned with the housing.

21. The tweezer of claim 20 wherein the housing is a tubular support.

22. A powered device for gripping small objects comprising housing of a longitudinally extended cylindrical shape and being arranged for gripping and maneuvering by the fingers of an operator,
a pivot pin mounted within said housing and extending diametrically in said housing,
a pair of gripping members disposed within said housing and with one of said members being pivotally mounted on said pivot pin and with both said members extending outside said housing in extending ends and with said one of said members being movable toward the other of said members for gripping small objects,
a spring disposed within said housing interposed between said one of said gripping members and said housing for pivoting said one of said gripping members away from gripping relation,
a power mechanism disposed inside said housing and being located to be offset to one side of said pivot pin opposite from the extent of said extending ends of said gripping members to the outside of said housing and being arranged with said spring for pressing said one of said gripping members against said spring when gripping small objects,
said one of said gripping members and said power mechanism being operatively associated whereby actuation of said power mechanism pivots said one gripping member into gripping relationship, and
said extending ends being pointedly shaped and arranged for gripping only small and delicate objects.

23. The powered device for gripping small objects as claimed in claim 22, wherein
said gripping members are arranged in said housing to be removable therefrom by being pulled out of said housing in the direction of said extending ends.

24. The powered device for gripping small objects as claimed in claim 22, including
a spring loaded detent operatively associated with each of said gripping members for releasably retaining said gripping members in said housing until force is applied to said gripping members in the direction of said extending ends to remove said gripping members from said housing.

25. The powered device for gripping small objects as claimed in claim 22, including
a cartridge removably disposed in said housing and being arranged to support said gripping members therein and being arranged for facilitating the replacement of said gripping members upon removal of said cartridge from said housing.

26. The powered device for gripping small objects as claimed in claim 25, including
a ball and spring assembly operatively disposed between said gripping members and said cartridge for releasably holding said gripping members to said cartridge.

27. The powered device for gripping small objects as claimed in claim 22, wherein
said extending ends of said gripping members extend in the direction away from said housing and said one of said gripping members extends in said direction beyond said extending end of said other of said gripping members when said gripping members are in the gripping relationship.

28. The powered device for gripping small objects as claimed in claim 22, wherein
one of said extending ends of said gripping members includes an offset extending tip portion angled relative to the remainder of said extending end thereof for being directed along a surface supporting said small object and to thereby facilitate maneuvering said device underneath said small object in picking up said small object with said gripping members.

29. The powered device for gripping small objects as claimed in claim 22, including
said housing having two recesses extending therein in the direction parallel to the longitudinal axis of the cylindrical shape and being in side-by-side relation to each other,
said gripping members being in insertable and withdrawal. sliding relation with said housing by being disposed in respective ones of said recesses, and
a releasable retainer interengaged with said housing and each of said gripper members for releasably securing said gripper members in said recesses.

30. The powered device for gripping small objects as claimed in claim 29, wherein said releasable retainers each consist of a ball and spring and a recess which are all arranged to produce a limted securing force on each said gripper member for securing said gripper members in said recesses.

* * * * *